United States Patent
Lim et al.

(10) Patent No.: US 7,555,578 B2
(45) Date of Patent: Jun. 30, 2009

(54) DEVICE FOR CONTROLLING ENDPOINTS OF USB DEVICE AND METHOD OF CONTROLLING ENDPOINTS OF USB DEVICE

(75) Inventors: Choong-Bin Lim, Yongin (KR); Se-Hoon Jeon, Hwasung (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 428 days.

(21) Appl. No.: 10/787,148

(22) Filed: Feb. 27, 2004

(65) Prior Publication Data

US 2005/0044286 A1    Feb. 24, 2005

(30) Foreign Application Priority Data

Aug. 19, 2003   (KR) .................. 10-2003-0057210

(51) Int. Cl.
G06F 13/00   (2006.01)
G06F 3/00    (2006.01)

(52) U.S. Cl. .......................... 710/52; 710/56
(58) Field of Classification Search ............ 710/52, 710/56

See application file for complete search history.

(56) References Cited

U.S. PATENT DOCUMENTS

| | | | |
|---|---|---|---|
| 6,389,029 B1* | 5/2002 | McAlear | 370/402 |
| 6,452,950 B1* | 9/2002 | Ohlsson et al. | 370/516 |
| 7,003,597 B2* | 2/2006 | Georgiou et al. | 710/56 |
| 2002/0004842 A1* | 1/2002 | Ghose et al. | 709/235 |
| 2002/0087710 A1* | 7/2002 | Aiken et al. | 709/232 |
| 2004/0025099 A1* | 2/2004 | Aikawa et al. | 714/748 |
| 2004/0027997 A1* | 2/2004 | Terry et al. | 370/276 |

* cited by examiner

Primary Examiner—Ilwoo Park
Assistant Examiner—Scott Sun
(74) Attorney, Agent, or Firm—Harness, Dickey & Pierce, P.L.C.

(57) ABSTRACT

A configuration of a USB device can include: a serial interface engine (SIE) operable as an interface to a USB host; a controller interface operable as an interface to a controller of the USB device; and a buffer section to buffer at least information transferred from the SIE to the controller interface, the buffer section including a plurality of buffers corresponding to a plurality of endpoints, respectively, where respective buffering capacities of the plurality of buffers are allocated to the plurality of endpoints based upon buffer-utilization information.

18 Claims, 12 Drawing Sheets

FIG. 5A
(RELATED ART)

| FIELD | PID | ADDR | ENDP | CRC5 |
|---|---|---|---|---|
| BIT | 8 | 7 | 4 | 5 |

| FIELD | PID | FRAME NUM | CRC5 |
|---|---|---|---|
| BIT | 8 | 11 | 5 |

| FIELD | PID | DATA | CRC16 |
|---|---|---|---|
| BIT | 8 | 0-8192 | 16 |

| FIELD | PID |
|---|---|
| BIT | 8 |

508

DEVICE FOR CONTROLLING ENDPOINTS OF USB DEVICE AND METHOD OF CONTROLLING ENDPOINTS OF USB DEVICE

CROSS-REFERENCE TO RELATED APPLICATIONS

This application relies for priority upon Korean Patent Application No. 2003-57210 filed on Aug. 19, 2003, the contents of which are hereby incorporated by reference in its entirety.

BACKGROUND OF THE INVENTION

1. Field of the Invention

The present invention relates to a semiconductor chip for a USB device, more particularly to a device for controlling a plurality of endpoints of the USB device and a method of controlling a plurality of endpoints of the USB device.

2. Description of the Related Art

Generally, various peripheral devices (for example a keyboard, a mouse, a monitor, a web camera, a joystick, a storage device, etc.) can connect (in a plug-and-play fashion) to a bus system of a host computer that conforms to the USB (Universal Serial Bus) specification. A USB system includes a USB host, a USB device and a USB interconnector. The USB host is connected to the USB device through a bus topology such as a tiered star topology, such as is shown in system 100 of FIG. 1 according to Related Art.

In the USB-complaint star topology of system 100, there can be up to seven layers. A USB hub is a center to which USB devices are connected. A host 102 is a root hub and represents a first layer. Host 102 is connected to the devices in a point-to-point method. A first hub 106 and a device (which is also described as a function) 104 are each connected to the host 102, and together represent a second layer. A second hub 112 and functions 108 and 110, which are connected to the first hub 106, and together represent a third layer. Fourth and subsequent layers have similar architectures.

USB host 102 is the only host in system 100. USB host 102 includes a host controller (see 212a of FIG. 2, mentioned below). Each of hubs 106, 112 and 114 provides USB system 100 with additional connection points. Devices 104, 108, 110 and 116 provide USB system 100 with various functions such as a joystick, a speaker, etc., and have been assigned unique USB addresses by USB host 102 according to which they are accessed, respectively. A physical signal cable connects USB host 102 and the USB device. The physical signal cable comprises a line supplying $V_{BUS}$=+5 volts, data lines $D_+$, $D_-$ and a ground line (GND).

According to the USB standard, data transfer speed is about 480 Mb/s in high-speed signaling mode, about 12 Mb/s in full-speed signaling mode, and about 1.5 Mb/s in low-speed signaling mode.

FIG. 2 is schematic view showing connections between a USB host and a USB device according to the USB specification of the Related Art.

Referring to FIG. 2, USB host 210 includes USB bus interface 212, USB system software 214 and client software 216. USB bus interface 212 has a host controller 212a and an SIE (Serial Interface Engine) 212b. USB device 220 has an architecture corresponding to that of USB host 210. As such, USB device 220 includes a USB bus interface 222 having an SIE 222b, a USB logical device 224 having an endpoint zero (EP0), and a function unit (hereafter function) 226. USB host 210 is physically connected to USB device 220 by a USB cable through SIEs 212b and 222b of USB bus interfaces 212 and 222, respectively.

USB system software 214 of USB host 210 manages USB device 220 through a logical default control pipe that is set to be connected to endpoint 0 (EP0). Client software 216 of USB host 210 communicates with function 226 of the USB device 220 through a plurality of logical pipes (hereafter pipes). Each logical pipe can be thought of as an independent channel that connects USB host 210 and the endpoints of USB device 220.

FIG. 3 is schematic view showing data interchange through pipes between USB host 210 and USB device 220 of FIG. 2 according to the USB specification of the Related Art.

Referring to FIG. 3, USB device 210 includes a plurality of endpoints each of which are identified by an endpoint number. Buffers of USB host 210 are connected to the endpoints of USB device 220 through the pipes. The pipes are independent from each other. Data flows through the pipes between USB host 210 and USB device 220. Properties of the endpoints vary depending upon bus access frequency, bandwidth, endpoint number, error processing procedure, maximum packet size, transfer type, and direction of data flow. For example, one endpoint corresponds to one application. Maximum packet size is determined in accordance with characteristics of USB host 210 and USB device 220, and varies depending on each of the endpoints.

In all USB devices, endpoint 0 is a default control pipe, the USB system software configures the USB device using endpoint 0, and the other endpoints are formed after the configuration of the USB device is completed through the default control pipe.

A USB bus protocol uses a polled token bus. Host controller 212a manages the transfer of all data. Most bus transactions, as shown in FIG. 4, includes the transfer of 3 packets.

FIGS. 4A and 4B are schematic views showing bus transactions according to the USB specification of the Related Art.

In the beginning of the bus transaction, host controller 210 sends a token packet. The token packet identifies the type of the bus transaction, a direction of the bus transaction, an address of USB device 220 and an endpoint number.

There are two directions of the bus transaction, namely an 'IN' direction and an 'OUT' direction. With the 'IN' bus transaction, as shown in FIG. 4A, data are transferred from USB device 220 to USB host 210. With the 'OUT' bus transaction, as shown in FIG. 4B, data are transferred from USB host 210 to the USB device 220.

USB host 210 or USB device 220 responds to receipt of data by sending a handshake packet. An 'ACK' handshake packet represents that USB host 210 or USB device 220 received data normally, and a 'NAK' handshake packet represents that USB host 210 or USB device 220 didn't receive data or that an error (such as a buffer becoming completely filled) occurred while USB host 210 or USB device 220 receives data. USB host 210 or USB device 220 resends the data.

Different types of packets are exchanged according to the USB standard. The type of packet is denoted by its packet identifier (PID). Within a type, there are various kinds of packets. Table 1 lists the various kinds of packets according to type (PID), and includes the name of each kind, the value of the PID field and a description. PID (Packet Identifier), Representative packet formats are shown in FIGS. 5A-5D according to the Related Art.

TABLE 1

| PID type | PID Kind (name) | PID <3:0> | Description |
| --- | --- | --- | --- |
| Token | OUT | 0001 | token for transfer data via 'OUT' bus transaction |
|  | IN | 1001 | token for transfer data via 'IN' bus transaction |
|  | SOF | 0101 | start of frame (1 ms or 125 μm) token |
|  | SETUP | 1101 | setup token |
| Data | DATA0 | 0011 | data packet PID even |
|  | DATA1 | 1011 | data packet PID odd |
|  | DATA2 | 0111 | data packet in high-speed signaling mode |
|  | M DATA | 1111 | data packet in high-speed signaling mode |
| Handshake | ACK | 0010 | handshake response when data are received without error |
|  | NAK | 1010 | handshake response when data are received with error |
|  | STALL | 1110 | control pipe is not ready |
|  | NYET | 0110 | no response yet |
| Special | PRE | 1100 | PREamble |
|  | ERR | 1100 | ERR |
|  | SPLIT | 1000 | Split |
|  | PING | 0100 | Ping |

FIG. 5A generally shows a format of a token packet 502, FIG. 5B specifically shows a format of a SOF (Start-Of-Frame) token packet 504, FIG. 5C generally shows a format of a data packet, and FIG. 5D generally shows a format of a handshake packet, all according to the USB specification of the Related Art.

General token packet 502 of FIG. 5A comprises an 8 bit PID field, a 7 bit address (ADDR) field, a 4 bit endpoint (ENDP) field and a 5 bit CRC field. Thus, the token packet 502 is described as having 3 bytes. SOF token packet 506 of FIG. 5B comprises an 8 bit PID field, an 11 bit of frame number field and a 5 bit CRC5 field. SOF token packet 504 represents a start of a frame. The period of a frame is about 1 ms in the full-speed signaling mode, and about 125 μm in the high-speed signaling mode. Data packet 506 of FIG. 5C comprises an 8 bit PID field, a data field having 0-8192 bits and a 16 bit CRC field. Handshake packet 508 of FIG. 5D comprises only an 8 bit PID field.

A USB host 102/210 may allocate addresses 0-127, or a maximum of 128 addresses, since the address (ADDR) field has 7 bits. A maximum of 127 USB devices may be connected to USB host 210 because one address is reserved for USB host 210. Each of the USB devices may allocate a maximum of 16 endpoints since the endpoint (ENDP) field has 4 bits.

The data transfer efficiency of an 'OUT' bus transaction between USB host 210 and USB device 220 greatly depends upon the configuration of the buffers used in the endpoint. In the case that the endpoint for receiving data from USB host 210 has only one buffer, data transfer speed decreases when the buffer is full of data because a NAK packet is generated and data transfer is temporarily interrupted.

An 'OUT' endpoint according to the Related Art, as shown in FIG. 6, has buffers 624 of a 'ping pong' configuration. Buffers 624 are located between an SIE 622 and a microprocessor control unit (MCU) interface 626 in a USB device 620. Each of endpoints (EP0, EP1, . . . , EPx) has two buffers (A, B).

Referring to FIG. 6, in considering the following case. A specific endpoint (EPx) receives first data from a USB 610 host and stores it in buffer A. Before a peripheral MCU fetches (via MCU interface 626) the first data stored in the buffer A, second data 626 are received from USB host 610 and stored in buffer B so that generation of a NAK can be avoided. When MCU 626 fetches the first data stored in buffer A and then endpoint EPx receives third data, endpoint EPx stores the third data in buffer A. Such a 'ping pong' buffer alternately stores data in buffers A and B.

However, since each of the endpoints requires two buffers of maximum packet size, a USB device 620 using the size maximum number of endpoints (16) will have 32 such maximum size buffers. Therefore, as the number of endpoints and the size of the buffers increase, the area of semiconductor chip for the buffers increases, power consumption of the USB device increases, and cost for the USB device increases.

Even though each of the endpoints has two buffers (A and B), the two buffers may not accommodate all of the data when a specific endpoint abruptly receives a relatively large amount of data as compared with other endpoints, and a NAK may be generated. In addition, when a specific endpoint receives a relatively smaller amount of data as compared with other endpoints, the specific endpoint requires only one buffer instead of two buffers. Therefore, resources of the USB device may be wasted.

SUMMARY OF THE INVENTION

Accordingly, the present invention is provided to substantially obviate one or more problems due to limitations and disadvantages of the related art.

Embodiments of the present invention provide a device and associated method, respectively, for controlling a plurality of endpoints of a USB device that adaptively changes the number of the buffers allocated to the endpoints based on buffer utilization data, so that the generation of NAK may be reduced and the performance of the USB device may be enhanced. Advantages of such embodiments include more efficient buffer utilization and/or data reception rates.

At least one embodiment of the present invention provides a device for controlling a first plurality of endpoints of a USB device. Such a device may include: a second plurality of buffers allocated to the first plurality of endpoints, respectively; and an endpoint buffer controller for managing an exchange of packets between a host and the USB device, obtaining buffer-utilization information for each of the endpoints and adaptively adjusting the buffers for the endpoints based upon the buffer utilization, respectively.

At least one other embodiment of the present invention provides a configuration of a USB device. Such a configuration comprises: a serial interface engine (SIE) operable as an interface to a USB host; a controller interface operable as an interface to a controller of the USB device; and a buffer section to buffer at least information transferred from the SIE to the controller interface, the buffer section including a plurality of buffers corresponding to a plurality of endpoints, respectively, where respective buffering capacities of the plurality of buffers are allocated to the plurality of endpoints based upon buffer-utilization information.

Another embodiment of the present invention further provides an endpoint buffer controller to adaptively allocate the respective buffering capacities of the plurality of buffers (mentioned above) based upon buffer-utilization information.

Additional features and advantages of the invention will be more fully apparent from the following detailed description of example embodiments, the accompanying drawings and the associated claims.

BRIEF DESCRIPTION OF THE DRAWINGS

The above and other advantages of the present invention will become more apparent by describing in detail the preferred embodiments thereof with reference to the accompanying drawings, in which:

FIGS. 5A, 5B, 5C and 5D are views of the Related Art showing packet formats according to USB specification;

DETAILED DESCRIPTION OF EXAMPLE EMBODIMENTS

Example embodiments of the present invention now will be described in detail with reference to the accompanying drawings.

Figure 7:
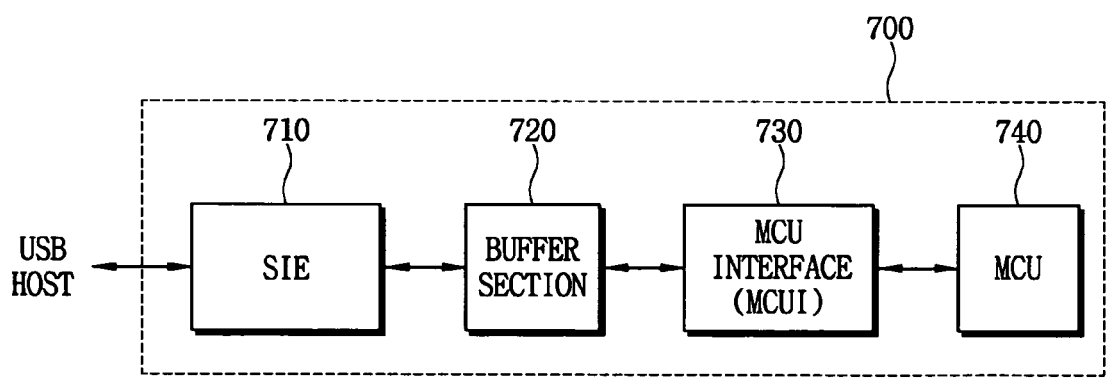
FIG. 7 is a schematic view showing a configuration of a USB device according to an embodiment of the present invention.

FIG. 7 is a schematic view showing a configuration of a USB device 700 according to an example embodiment of the present invention. USB device 700 includes an SIE (again, Serial Interface Engine) 710, a buffer section 720, a peripheral processor MCU (again, microprocessor control unit) 740 and an MCU interface 730 (MCUI).

Figure 1:
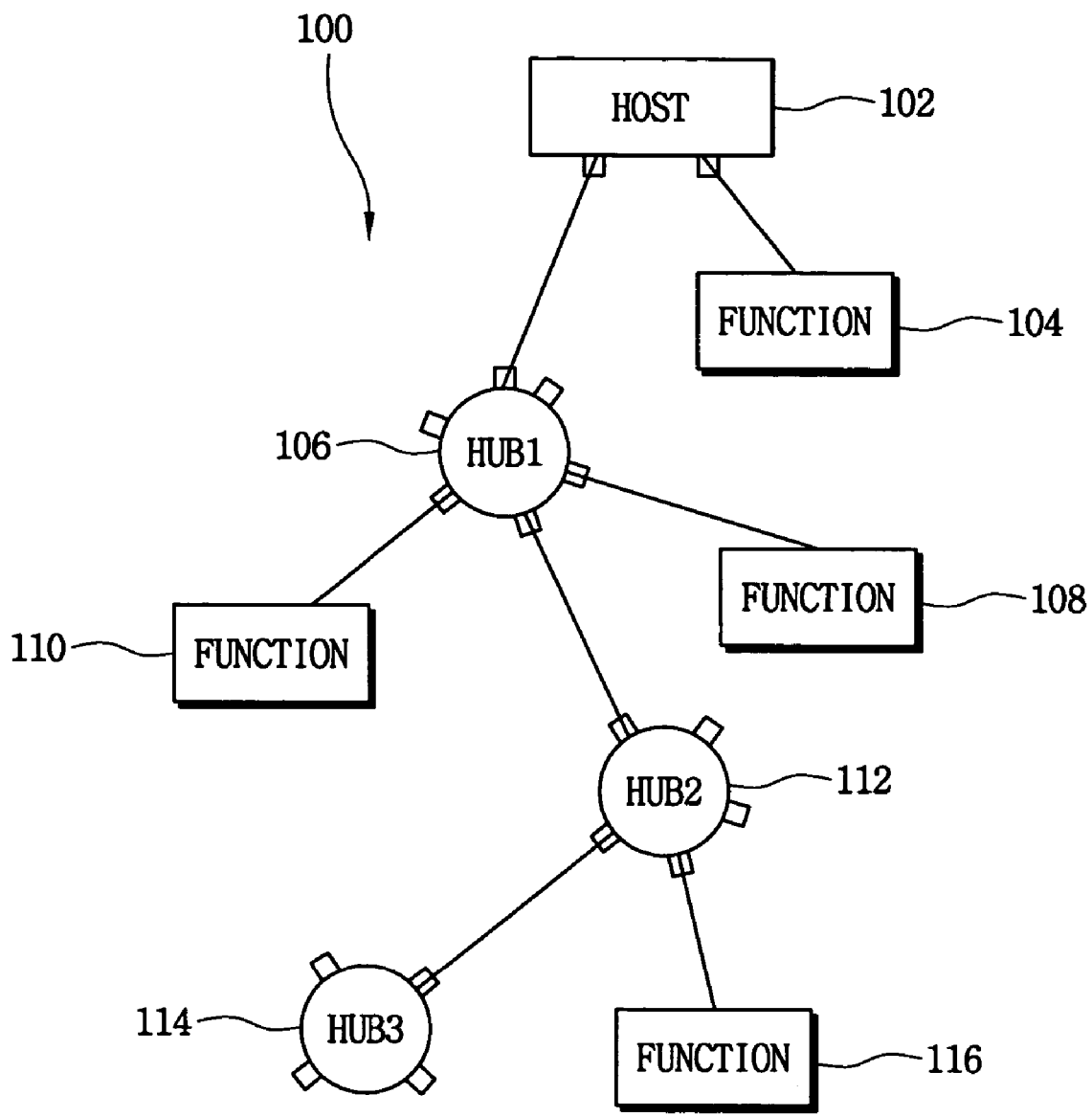
FIG. 1 is a schematic view of the Related Art showing a USB bus topology according to USB specification.
Figure 2:
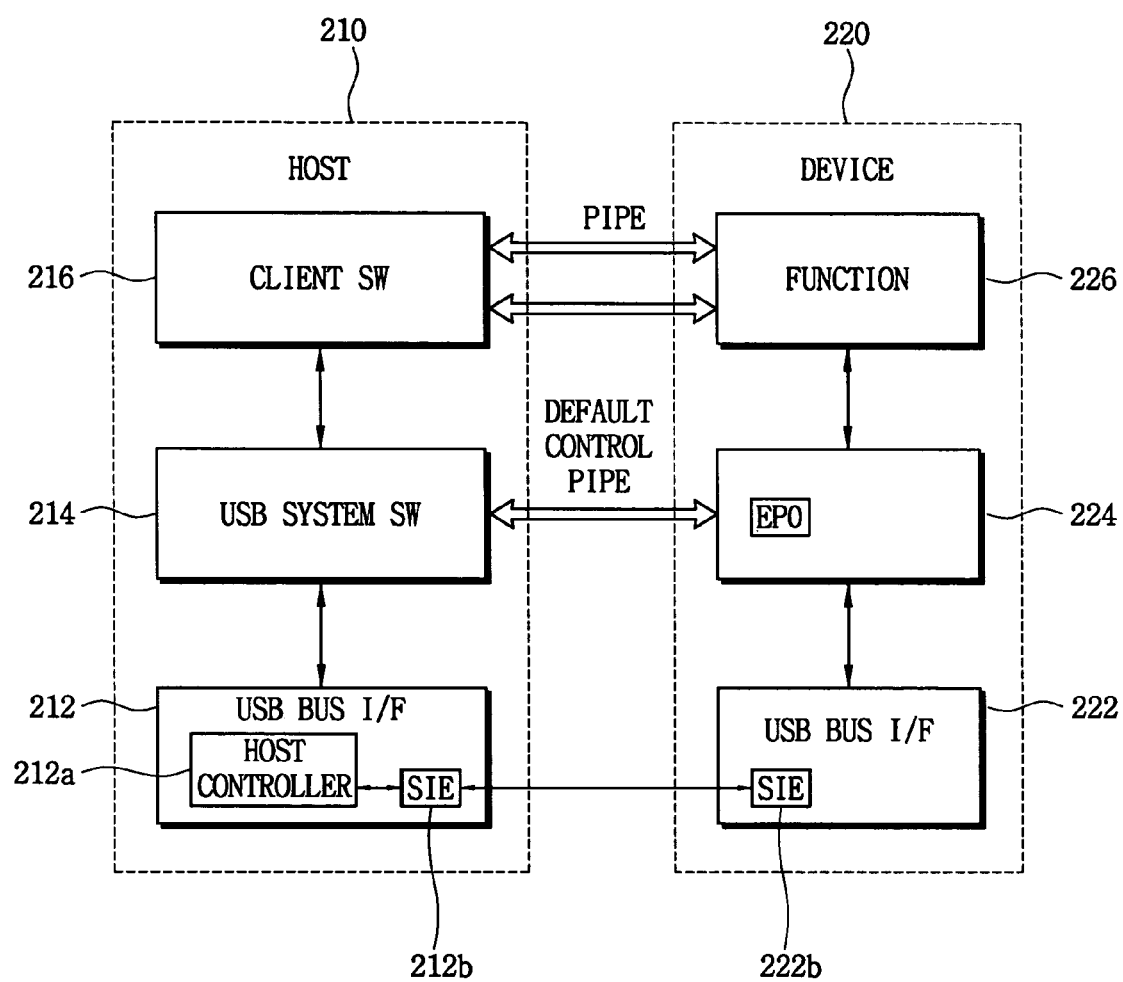
FIG. 2 is schematic view of the Related Art showing a USB host and a USB device according to USB specification.
Figure 3:
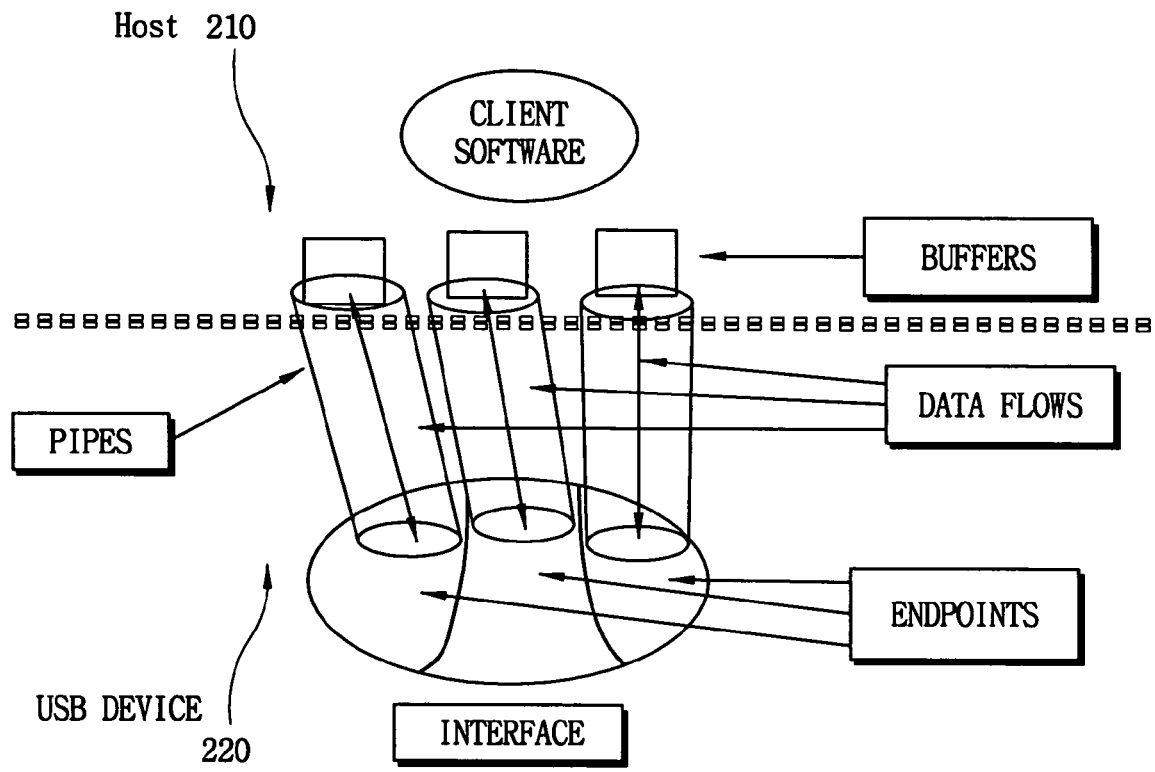
FIG. 3 is schematic view of the Related Art showing data interchange through pipes between the USB host and the USB device of FIG. 2 according to USB specification.
Figure 4A:
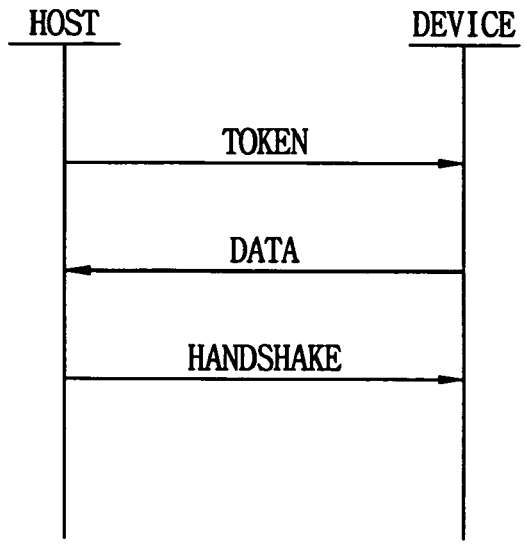
FIGS. 4A and 4B are schematic views of the Related Art showing bus transactions according to USB specification.
Figure 4B:
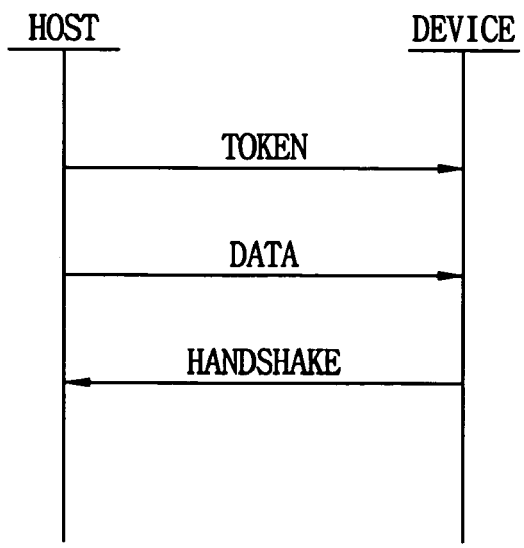
Figure 6:
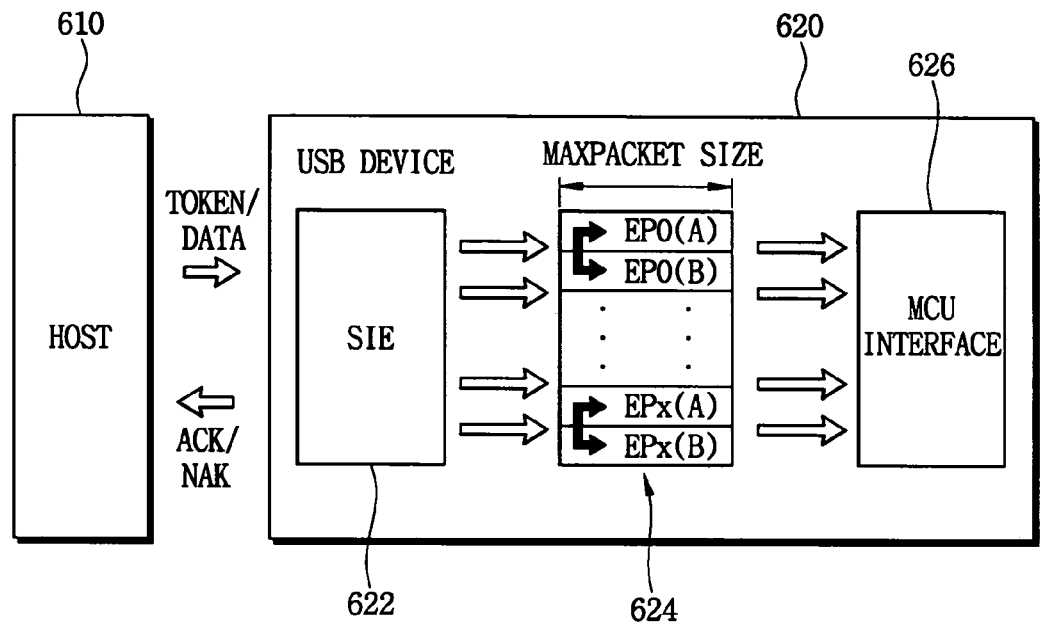
FIG. 6 is a schematic view of the Related Art showing a buffer of a USB device.

SIE 710 connects USB device 700 to a USB hub or USB host, e.g., 610 of Related Art FIG. 6, according to USB protocol. Buffer section 720 temporarily stores data being transferred from the USB host, e.g., 610, to MCUI 730, and vice-versa. According to an embodiment of the present invention, MCU 740 performs a function of adaptively allocating the sizes of the individual buffers within the buffer section 720. MCU 740 also generally controls USB device 700.

Figure 8:
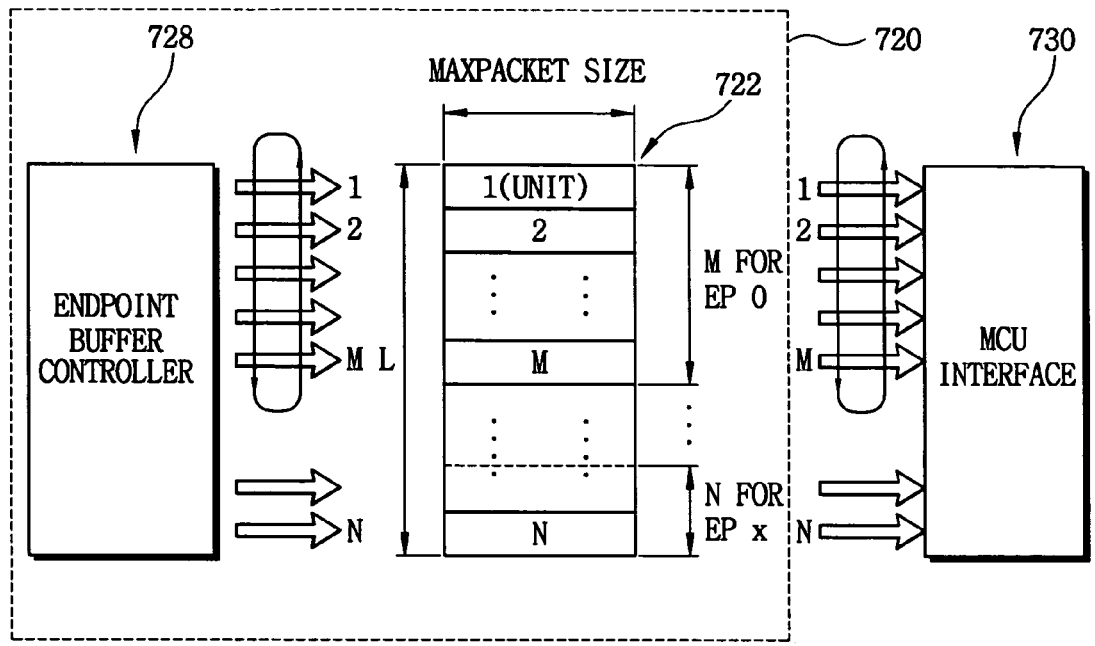
FIG. 8 is a schematic view showing an example of operation of the buffer section of 720, according to an embodiment of the present invention.
Figure 9:
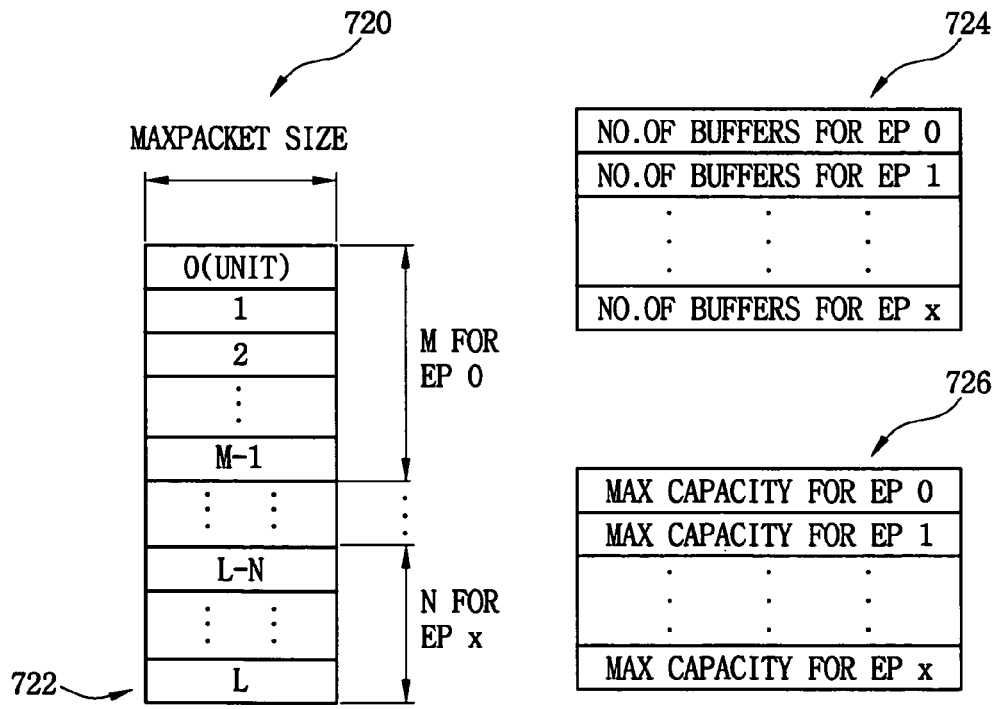
FIG. 9 is a block diagram representing an example configuration of endpoints of the buffer section of FIG. 7, according to an embodiment of the present invention.

For example, as depicted in the block diagram of FIG. 8 (according to an embodiment of the present invention), buffer section 720 includes: an endpoint buffer controller 728; an 'OUT' buffer portion 722; and an 'IN' FIFO buffer portion (not shown in FIG. 9 for simplicity). 'OUT' (or endpoints) buffer portion 722 receives data sent by the host USB and can have a first-in, first out (FIFO) arrangement. The 'IN' buffer temporarily stores the data to be transmitted to the host USB and can be arranged/configured in a manner corresponding to buffer portion 722. The 'OUT' and 'IN' buffer portions are controlled by endpoint buffer controller 728 as part of managing the exchange of data between SIE 710 and MCUI 730. The performance of a USB system depends on efficient use of the buffers within the 'OUT' and 'IN' buffer portions, respectively.

FIG. 8 is a schematic view showing an example of operation of the buffer section 720, according to an embodiment of the present invention. FIG. 9 is a block diagram representing an example configuration of endpoints of buffer section 720 of FIG. 7, according to an embodiment of the present invention. In FIG. 8, in an initial status after a reset operation, each of the endpoints has the same size. Alternately, each of the endpoints may have a different default size. For example, as shown in FIG. 8, the endpoint EP0 has M units, and the endpoint EPx has N units.

Received packets are stored one after another in a first unit of the multiple packet buffer of the corresponding endpoint. MCU 740 reads packets one after another from the first unit of the multiple packet buffer of corresponding endpoint.

Figure 10:
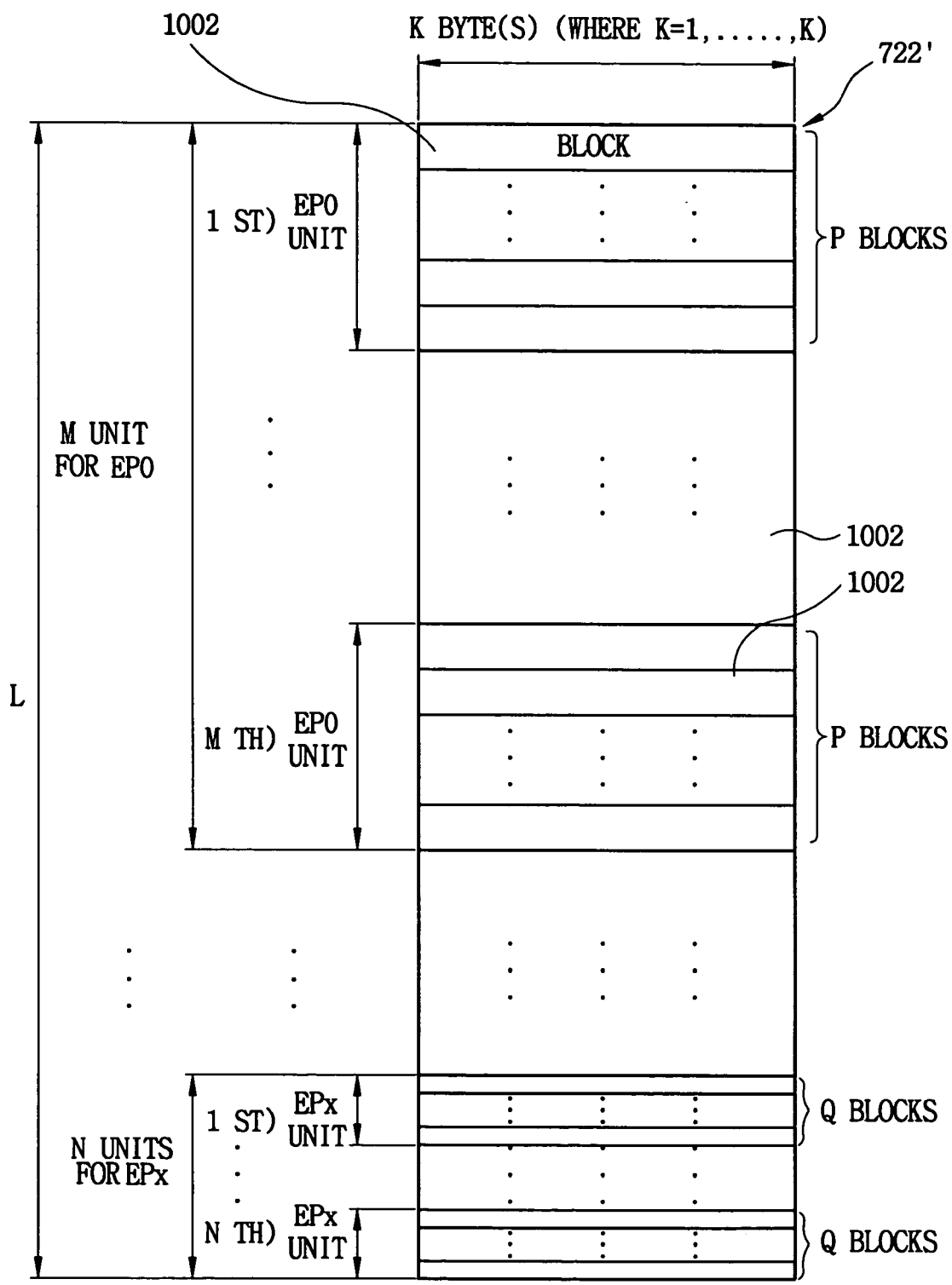
FIG. 10 is a block diagram showing an example allocation of buffering capacity of the endpoint for the buffer portion of FIG. 9, according to an embodiment of the present invention.

Since each of the endpoints (EP0, EP1, ..., EPx) may have a different maximum packet size $$S_{EPi}^{max},$$

differing numbers of blocks 1002 are allocated bytes K (K is a positive integer, 1, 2, 3, ..., k) within buffer portion 722' are used so as to more efficiently use of buffer space, as shown in FIG. 10.

FIG. 10 is a block diagram showing a buffer portion 722'; which is an example of allocation of buffering capacity within buffer portion 722' of FIG. 8, according to an embodiment of the present invention. In FIG. 10, the width of buffer portion 722' is one block 1002, which is K bytes. Each endpoint EPi can have a different unit size, where one unit can hold one packet; thus each endpoint EPi can accommodate a different size packet. The total number of units in buffer portion 722' is L. For example, the endpoint EP0 has M units, and the endpoint EPx has N units. Each of the units (M, N) can accommodate (and here, for the purposes of discussion, such is assumed) different maximum packet sizes. For example, each unit of the endpoint EP0 can have P blocks, where P=(maximum packet size of the endpoint EP0)/(K bytes), and the size of buffer that EP0 represents is (M)(P)(K). For example, each unit of the endpoint EPx can have Q blocks, where, e.g., Q<P (assuming $$S_{EP0}^{max} > S_{EPx}^{max}$$

) and Q=(maximum packet size of the endpoint EPx)/(K bytes), and the size of buffer that EPx represents is (N)(Q)(K).

While the example of FIG. 10 has illustrated accommodation of different sized packets, it is alternatively contemplated that the units can be of the same size such that all of the endpoints accommodate the same size packet.

Figure 11:
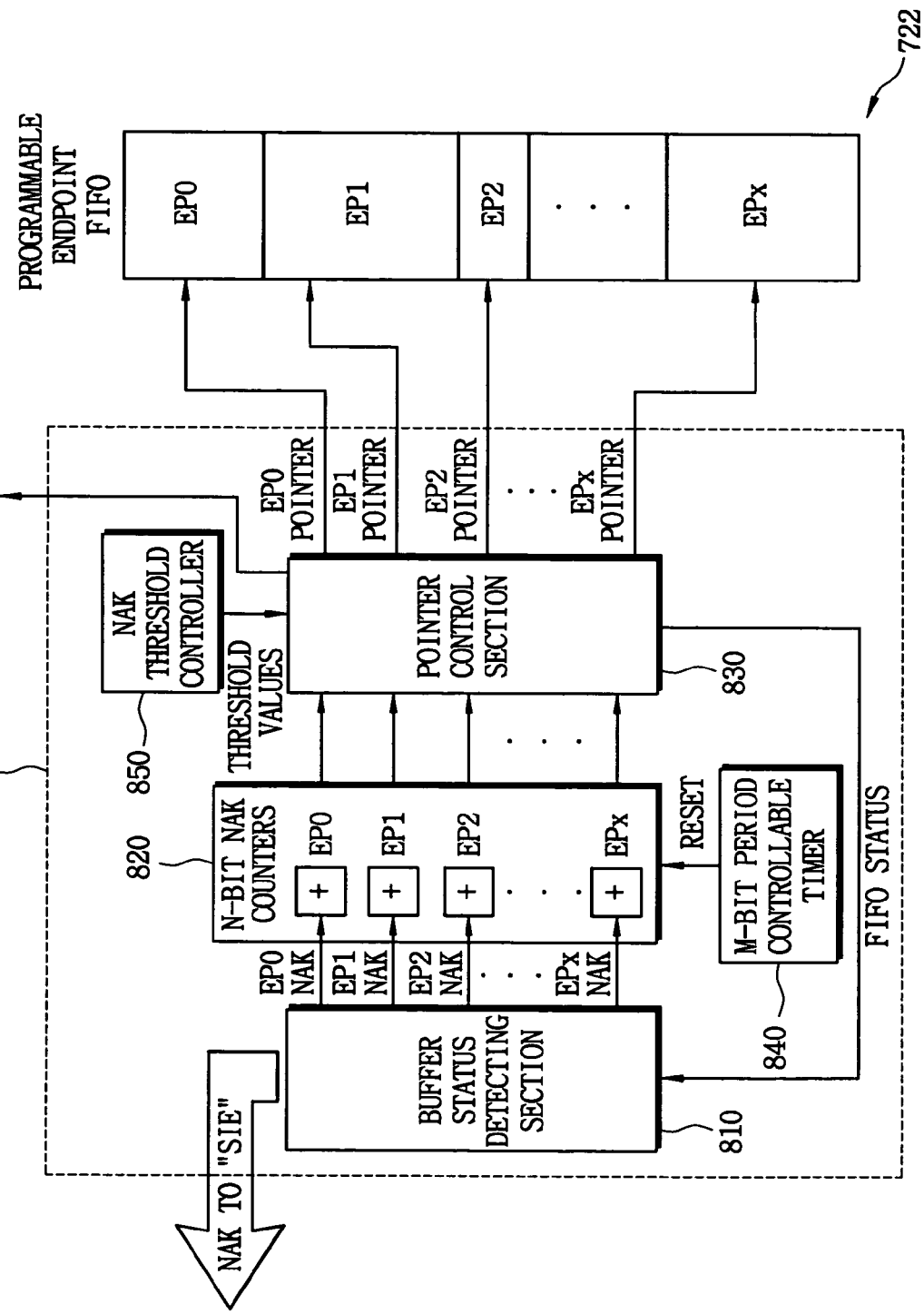
FIG. 11 is a schematic view showing an example of an endpoint control device according to an embodiment of the present invention.

FIG. 11 is a schematic view showing in more detail an example of endpoint buffer section 720 according to an embodiment of the present invention. In FIG. 11, buffer section 720 includes endpoint buffer controller 728 and buffer portion 722. Buffers are adaptively (and typically non-uniformly) allocated to respective endpoints. Endpoint buffer controller 728 includes a buffer status detecting section 810, a NAK counting section 820, a timer 840, a pointer control section 830 and a NAK threshold controller 850. Each pointer EPi-POINTER points to an end, or a beginning, of a portion of memory allotted to the buffer that EPi represents.

Generally, endpoint buffer controller 728 generates a NAK and sends it to the SIE 710 when the corresponding endpoint FIFO buffer is full and temporarily cannot accommodate additional data. Endpoint buffer controller 728 counts the number of NAKs and generates an interrupt signal and sends it to MCU 740 when the NAK count exceeds a threshold value, and also sets a pointer of endpoints buffer 722 under the control of upper level software.

Buffer status detecting section 810 determines whether an OUT packet can be accommodated based on buffer-utilization information maintained for the FIFO buffers within buffer section 722. Such buffer-utilization information includes the values/characterizations FULL, HALF and EMPTY that represent the degree to which the FIFO buffers in buffer section 772 are full. It is buffer status detecting section 810 that generates the NAK handshake packet when an OUT packet cannot be accommodated.

The NAK counter 820 counts the number of NAKs that occurs for each of the endpoints during a period T, as defined by timer 840, and outputs the numbers of NAKs counted to pointer control section 830 when a count reset signal is generated by timer 840. For example, the number of the NAKs may increase whenever N (N is 1, 2, . . . , n, n is natural number) NAKs are generated.

Timer 840 generates the count reset signal at the expiration of every period T. Period T may be set by software program. For example, timer 840 may set the period T by counting the SOF (Start Of Frame) signal output from the USB host. More particularly, where the mode is assumed to be the full-speed mode of the USB protocol, and the SOF signal occurs every 1 msec, then T can be T=C×1 msec (C is positive interger). Alternatively, T can take other values based on the SOF period, or some other interval.

Threshold control section 850 sets the threshold value against which the NAK counts are compared. A programmer may set the threshold value. When a NAK count exceeds the threshold value, pointer control section 830 generates the interrupt signal to output an interrupt signal to MCU 740, so that the size of the corresponding endpoint may be adaptively increased.

Figure 12:
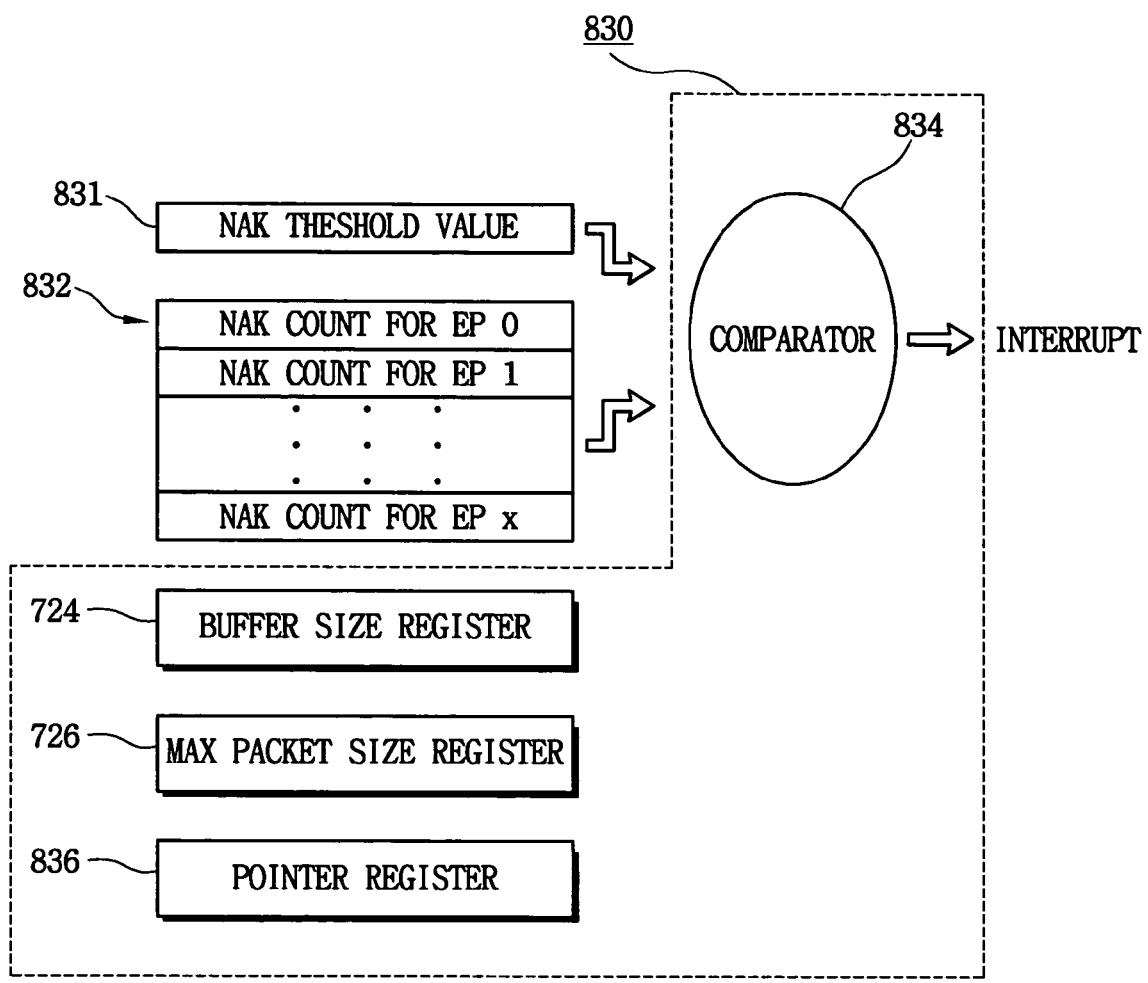
FIG. 12 is a schematic view showing a pointer control section of FIG. 11, according to an embodiment of the present invention.

FIG. 12 is a schematic view showing pointer control section 830 of FIG. 11, according to an embodiment of the present invention.

Pointer control section 830, as shown in FIG. 12, includes a NAK threshold register 831, a NAK counter register set 832 and a comparator 834. Alternatively, FIFO pointer control section 830 may further include maximum packet size register 724, buffer size register set 726, pointer register 836.

MCU 740 receives an interrupt signal generated by pointer control section 830, checks the NAK count register 832 and adaptively adjusts endpoint buffers section 722 for each of the endpoints based on the respective NAK count. The data temporarily stored in buffers section 722 are read before MCU 740 resets the endpoint FIFO buffers for each of the endpoints. When a specific endpoint receives a packet from the USB host during the reset process carried out by MCU 740, a NAK for the specific endpoint is generated so that the specific endpoint stops receiving the packet from the USB host.

The size of buffer portion 722 is the product of a matrix-type multiplication of a maximum packet size register set 726 and a buffer size register set 724. Register sets 726 and 724 can be located in endpoint buffer controller 728 (refer to FIG. 11), or in a FIFO pointer control section 830 (refer to FIG. 12), and may be accessed and/or manipulated by software program or by hardware.

Maximum capacity register set 726 defines a maximum buffering capacity for each of the endpoints, respectively. Buffer size register set 724 defines a number of buffering unit(s) allocated to each of the endpoints, respectively. A maximum buffering capacity that can be accommodated by each of the endpoints corresponds to the number of buffers for that endpoint The number and size of the buffers for each of the endpoints may differ, and can be adaptively changed. Regardless of the distribution of buffering capacity among the endpoints, the total available buffering capacity is typically a fixed size.

Figure 13:
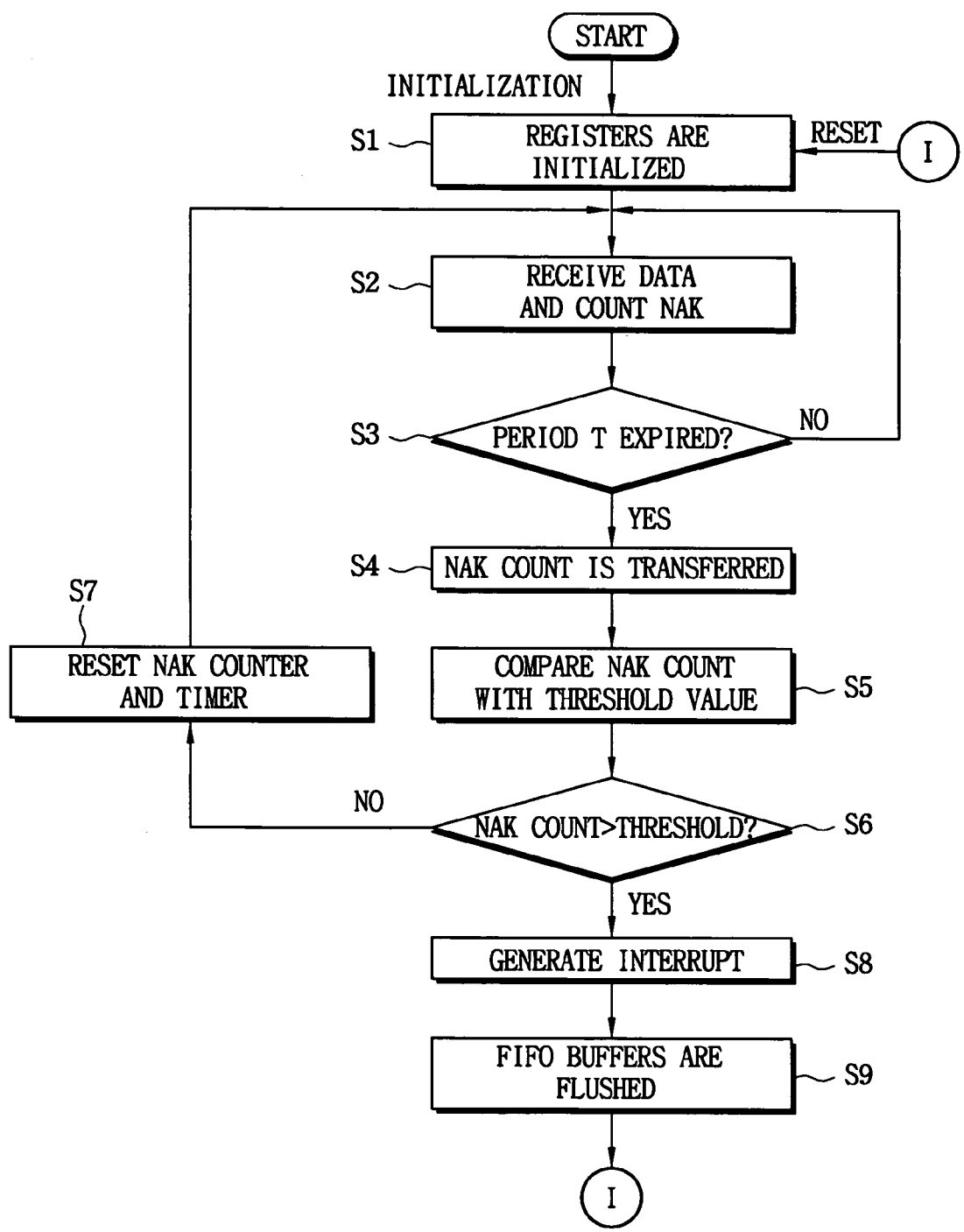
FIG. 13 is a flow chart showing a method of controlling endpoints of the USB device, according to an embodiment of the present invention.

FIG. 13 is a flow chart showing a method of controlling endpoints of a USB device, according to an embodiment of the present invention.

Referring to FIG. 13, first, each of registers 724, 726 and 831 as well as timer 840 is initialized by MCU 740 when a reset occurs or initial power is supplied to the USB device (step S1). Particularly, the size of the buffer for each of the endpoints, the NAK threshold value and period T of timer 840 are respective fixed values.

Flow proceeds in FIG. 13 to step S2. There, an endpoint receives data from the host USB via endpoint buffer controller 728, which uses the corresponding OUT buffer of buffer portion 722 to temporarily store the packets. When the corresponding OUT buffer of buffer portion 722 is full, buffer status detecting section 810 generates a NAK, which is counted by NAK counter 820.

At decision step S3, it is determined if period T has expired. If not, then flow loops back to step S2. But if period T has expired, the output of the $i^{th}$ counter in NAK counter 820 is transferred to NAK count register set 832 of the FIFO pointer control section 830 (step S4). Then, comparator 834 compares the counts from NAK counter 820 with the threshold value (step S5).

When the NAK counts are less than the threshold value ("NO" output of decision step S6), NAK counter 820 and timer 840 are reset (step S7), and step S2 is repeated.

When one or more of the NAK counts is greater than the threshold value, an interrupt signal is generated so that MCU 740 can adaptively adjust endpoints buffer portion 722 (step S8). A NAK is also generated when a specific endpoint receives a packet from the host USB during the reset process of MCU 740. After the interrupt is generated and the reset process is carried out, the data stored in buffer portion 722 are processed and flushed (step S9).

Figure 14:
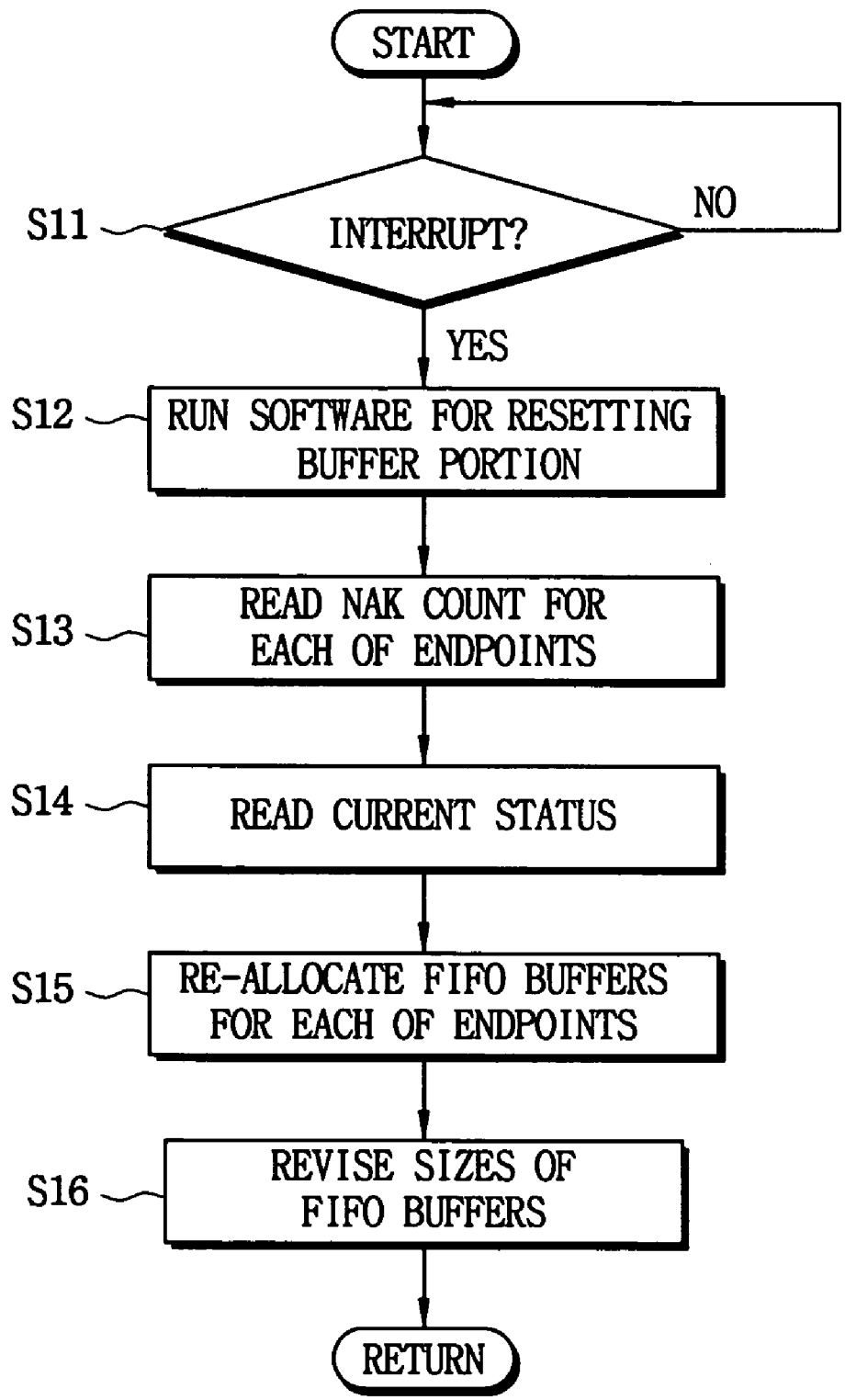
FIG. 14 is a flow chart showing a method of changing a configuration of endpoint buffers, according to an embodiment of the present invention.

FIG. 14 is a flow chart showing a method of changing the configuration of buffer portion 722, according to an embodiment of the present invention.

Referring to FIG. 14, when the interrupt signal is generated, MCU 740 can run software for adaptively adjusting the buffer portion 722 (steps S11 and S12).

The software for resetting the endpoints buffer portion 722 reads the values stored in maximum packet size register set 724 and buffer size register set 726, reads the NAK count for each of the endpoints from the NAK count register 832 and checks the current utilizations (FULL, HALF or EMPTY) of the FIFO buffers for each of the endpoints in buffer portions 722 (steps S13 and S14).

The number of FIFO buffers for each of the endpoints can be re-allocated according to a buffer reset algorithm, and the sizes of the FIFO buffers for each of the endpoints are revised (steps S15 and S16).

The buffer reset algorithm may implement various approaches. For example, at the end of period T, the size of the FIFO buffer that has the lowest NAK count may be decreased, and the size of the FIFO buffer that has the highest NAK count may be increased. Alternately, the sizes of the FIFO buffers may be determined in proportion to the respective NAK counts.

While the example embodiments of the present invention and its advantages have been described in detail, it should be understood that various changes, substitutions and alterations can be made herein without departing from the scope of the invention.

What is claimed is:

1. A device for controlling a plurality of endpoints of a USB device, the device comprising:
    a plurality of buffers allocated to the plurality of endpoints, respectively; and
    an endpoint buffer controller for managing an exchange of packets between a host and the USB device, obtaining buffer-utilization information for each of the endpoints and adaptively adjusting:
        a number of the buffers allocated to each of the endpoints and respective maximum buffer size allocated to each of the endpoints based upon a respective NAK count corresponding to a respective buffer.

2. The device of claim 1, wherein each of the plurality of buffers has a plurality of units and a maximum size of unit size ×Z, where Z is a positive integer representing the total number of units per buffer, respectively.

3. The device of claim 1, wherein the endpoint buffer controller includes:
    a buffer status detecting section for determining whether an OUT packet from the host may be accommodated based on status information maintained for the FIFO buffers, and for generating a NAK when the OUT packet cannot be accommodated;
    a timer for generating a NAK count reset signal for every T period;
    a NAK counter for counting how many NAKs are generated for each of the endpoints within a period; and
    a pointer control section for generating an interrupt signal when the respective NAK count for one or more of the endpoints exceeds a threshold value.

4. The device of claim 3, further including a threshold control section for setting the threshold value.

5. The device of claim 4, wherein the endpoint buffer controller further includes a peripheral processor MCU, the MCU adaptively changing numbers of buffers allocated to the endpoints depending on the buffer-utilization information and storing the reallocated numbers in a register set.

6. The device of claim 3, further comprising:
    a timer to determine the period T by doing one of taking the inverse of a frequency determined by counting SOF (Start Of Frame) signals from the host during an interval and adopting a frame period of a full-speed mode of a USB protocol.

7. The device of claim 3, wherein the pointer control section includes:
    a NAK counter register set for storing the NAK counts for the endpoints;
    a comparator for comparing the NAK counts stored in the NAK counter register with the threshold value, respectively;
    a maximum packet size register set for defining a maximum packet size for each of endpoints; and
    a buffer size register set for defining a size for each of the endpoints.

8. The device of claim 1, wherein the buffers are first-in, first-out (FIFO) buffers.

9. A method of controlling a plurality of endpoints of a USB device, the method comprising:
    initializing buffers of each of the endpoints;
    counting, when data are received at each of the endpoints, numbers of NAKs generated during a period T, respectively;
    comparing the NAK counts with a threshold value; and
    adaptively adjusting a number of the buffers allocated to each of the endpoints based on the NAK counts when one or more of the NAK counts exceeds the threshold value, and a respective maximum buffer size allocated to each of the endpoints based on the NAK counts when one or more of the NAK counts exceeds the threshold value.

10. The method of claim 9, wherein the period T is obtained by doing one of taking the inverse of a frequency determined by counting SOF (Start Of Frame) signals from the host during an interval and adopting a frame period of a full-speed mode of a USB protocol.

11. The method of claim 9, further comprising:
    generating an interrupt when one or more NAK counts exceeds the threshold value; and
    changing numbers of the buffers allocated to the endpoints based on the NAK counts, respectively, when the interrupt is generated.

12. The method of claim 9, further comprising:
    operating the buffers of the endpoints of a first-in, first-out (FIFO) basis.

13. A configuration of a USB device comprising:
    a serial interface engine (SIE) operable as an interface to a USB host;
    a controller interface operable as an interface to a controller of the USB device; and
    a buffer section to buffer at least one of information transferred from the SIE to the controller interface, the buffer section including a plurality of buffers corresponding to a plurality of endpoints, respectively,
        a number of the buffers being allocated to each of the plurality of endpoints based upon a respective maximum buffer size of the plurality of buffers allocated to each of the plurality of endpoints being adjusted based upon respective NAK count corresponding to a respective buffer.

14. The USB device configuration of claim 13, further comprising:
    an endpoint buffer controller to adaptively allocate the respective buffering capacities of the plurality of buffers based upon buffer-utilization information.

15. The USB device configuration of claim 13, wherein:
    each of the buffers is organized as a plurality of buffering units, respectively; and
    each of the buffering units of a buffer includes a plurality of blocks of storage space, respectively.

16. The USB device configuration of claim 13, wherein each of the plurality of buffers is arranged to operate as a first-in, first-out (FIFO) buffer.

17. A device for controlling a plurality of endpoints of a USB device, the device comprising:
   a plurality of buffers allocated to the plurality of endpoints, respectively; and
   an endpoint buffer controller for managing an exchange of packets between a host and the USB device, obtaining buffer-utilization information for each of the endpoints and adaptively adjusting:
   a number of the buffers allocated to each of the endpoints based upon respective NAK count corresponding to a respective buffer.

18. The device of claim 17, wherein the endpoint buffer controller adaptively adjusts respective maximum buffer size of the buffers allocated to each of the endpoints based upon the buffer utilization, respectively.

\* \* \* \* \*